United States Patent

Grodkiewicz et al.

[15] 3,659,136

[45] Apr. 25, 1972

[54] GALLIUM ARSENIDE JUNCTION DIODE-ACTIVATED UP-CONVERTING PHOSPHOR

[72] Inventors: William H. Grodkiewicz, Murray Hill; Shobha Singh, Summit; Le Grand G. Van Uitert, Morris Township, all of N.J.

[73] Assignee: Bell Telephone Laboratories, Incorporated, Murray Hill, N.J.

[22] Filed: Apr. 16, 1969

[21] Appl. No.: 822,847

[52] U.S. Cl. ........................313/108 D, 252/301.4, 331/94.5

[51] Int. Cl. ..........................................H01j 1/63, C09k 1/06

[58] Field of Search ...........................313/108 D; 252/301 X

[56] References Cited

UNITED STATES PATENTS

| | | | |
|---|---|---|---|
| 3,339,074 | 8/1967 | Franks | 250/213 |
| 3,405,371 | 10/1968 | Johnson et al. | 331/94.5 |
| 3,163,610 | 12/1964 | Yocom | 250/301.4 X |
| 3,418,246 | 12/1968 | Royce | 250/301.4 S |
| 3,533,956 | 10/1970 | Snitzer | 252/301.4 R X |
| 3,541,018 | 11/1970 | Hewes et al. | 252/301.4 R |
| 3,541,022 | 11/1970 | Hewes | 252/301.4 S |

OTHER PUBLICATIONS

Johnson et al., "Energy Transfer from $Er^{3+}$ to $Tm^{3+}$ and $Ho^{3+}$ Ions in Crystals," Physical Review; Volume 133, Number 2A; January 20, 1964; pages A494 to A498.

*Primary Examiner*—Robert Segal
*Attorney*—R. J. Guenther and Edwin B. Cave

[57] ABSTRACT

Electro-luminescent output in the visible spectrum results from use of a GaAs infrared-emitting diode provided with a coating of a compound having at least one each of two different anions or at least one anion vacancy in some unit cells. The compound, exemplified by the oxychlorides and fluorochlorides, contains the ion pair $Yb^{3+}$—$Er^{3+}$, $Yb^{3+}$—$Ho^{3+}$, $Yb^{3+}$—$^{3+}$ or mixtures thereof.

5 Claims, 2 Drawing Figures

INVENTORS
W. H. GRODKIEWICZ
S. SINGH
L. G. VAN UITERT
BY George S. Indig
ATTORNEY

GALLIUM ARSENIDE JUNCTION DIODE-ACTIVATED UP-CONVERTING PHOSPHOR

BACKGROUND OF THE INVENTION

1. Field of the Invention

The invention is concerned with electro-luminescent devices having outputs at visible wavelengths and to phosphors used in such devices. Contemplated use is in display devices on communication and computer equipment.

2. Description of the Prior Art

There is a recognized need for a low power level, long lifetime electro-luminescent device. While several avenues have been investigated, many consider the direct emitting PN junction semiconductor diode to be the most promising.

There is a large body of reported work considering gallium phosphide diodes. Depending on the dopant used, GaP junctions may emit in the red or the green. The red emitting device is more efficient and its development has now attained a fair level of sophistication. Recently, such a diode operating at an efficiency of 3.4 percent was reported; I. Ladany, Electro-Chemical Society Meeting, Montreal, October 11, 1968, Paper 610, RNP.

Silicon-doped GaAs diodes are several times as efficient (up to about 20 percent at room temperature) but emit at infrared rather than visible wavelengths. The possibility exists that the GaAs infrared output may be up-converted to a visible wavelength with reasonable conversion efficiency.

It was recently announced that appreciable output at a visible wavelength had been obtained by use of a conversion phosphor coating on such a silicon-doped GaAs diode, see S. V. Galginaitis et al., International Conference on GaAs, Dallas, October 17, 1968, "Spontaneous Emission Paper No. 2". The coating, which depends on a two-photon process, utilizes the ytterbium-erbium ion pair in a host of lanthanum fluoride.

In the coated device, infrared emission with a peak wavelength at about 0.93$\mu$ (micron) is absorbed by $Yb^{3+}$ with a peak absorption at 0.98$\mu$. Transfer and two photon excitation results in $Er^{3+}$ green emission at 0.54$\mu$.

While the coated GaAs diode represents a clear technological advance, efficiency at this stage in its development is not equal to that of the best GaP diodes with the latter operating in the red.

SUMMARY OF THE INVENTION

GaAs infrared diodes provided with a conversion coating of a compound having at least one each of two different anions or at least one anion vacancy in some unit cells (or formula equivalent-amorphous matrices) and also containing the $Yb^{3+}$—$^{3+}$, $Yb^{3+}$—$Ho^{3+}$, $Yb^{3+}$—$Tm^{3+}$ ion pair or mixtures thereof show increased visible output as compared with $LaF_3$ coated devices. Improved conversion efficiency is attributed, at least in part, to the anisotropic nature of the host environment due to a non-symmetrical array of anions of differences in neighboring anions with its attendant crystal field splitting for the $Yb^{3+}$ absorption spectra.

In the exemplary oxychloride and fluorochloride hosts, relatively broad $Yb^{3+}$ absorption peaks at about 0.94$\mu$ permitting a particularly good match for existing silicon-doped GaAs diode emissions and such host materials constitute a preferred embodiment of this invention.

Depending on the structure and the concentration of sensitizer ($Yb^{3+}$) and activator ($Er^{3+}$) ions in such hosts, blue, green or red fluorescence can be realized. Strong excitation may result in appreciable green and blue emission at wavelengths of about 0.55 and 0.41$\mu$, respectively, and strong emission in the red at a wavelength of about 0.66$\mu$. However, for example, in the YOCl and $Y_3OCl_7$ hosts, fluorescence appears red or green, respectively, to the eye for the lowest levels of discernable emission. Improvement in attainable brightness in the green in such cases and/or an adjustment in the apparent output color may result from the addition of limited quantities of holmium ($Ho^{3+}$) which typically emits at about 0.54$\mu$ in the green.

Attention to the considerations set forth above sometimes dictates preferred ranges of activator ($Er^{3+}$, $Ho^{3+}$ or $Tm^{3+}$) and sensitizer ($Yb^{3+}$) ion contents. Together, these may be less than the total cation content as various inactive cations such as yttrium, lanthanum, lutecium or gadolinium may be utilized.

DETAILED DESCRIPTION

1. DRAWING

Figure 2:
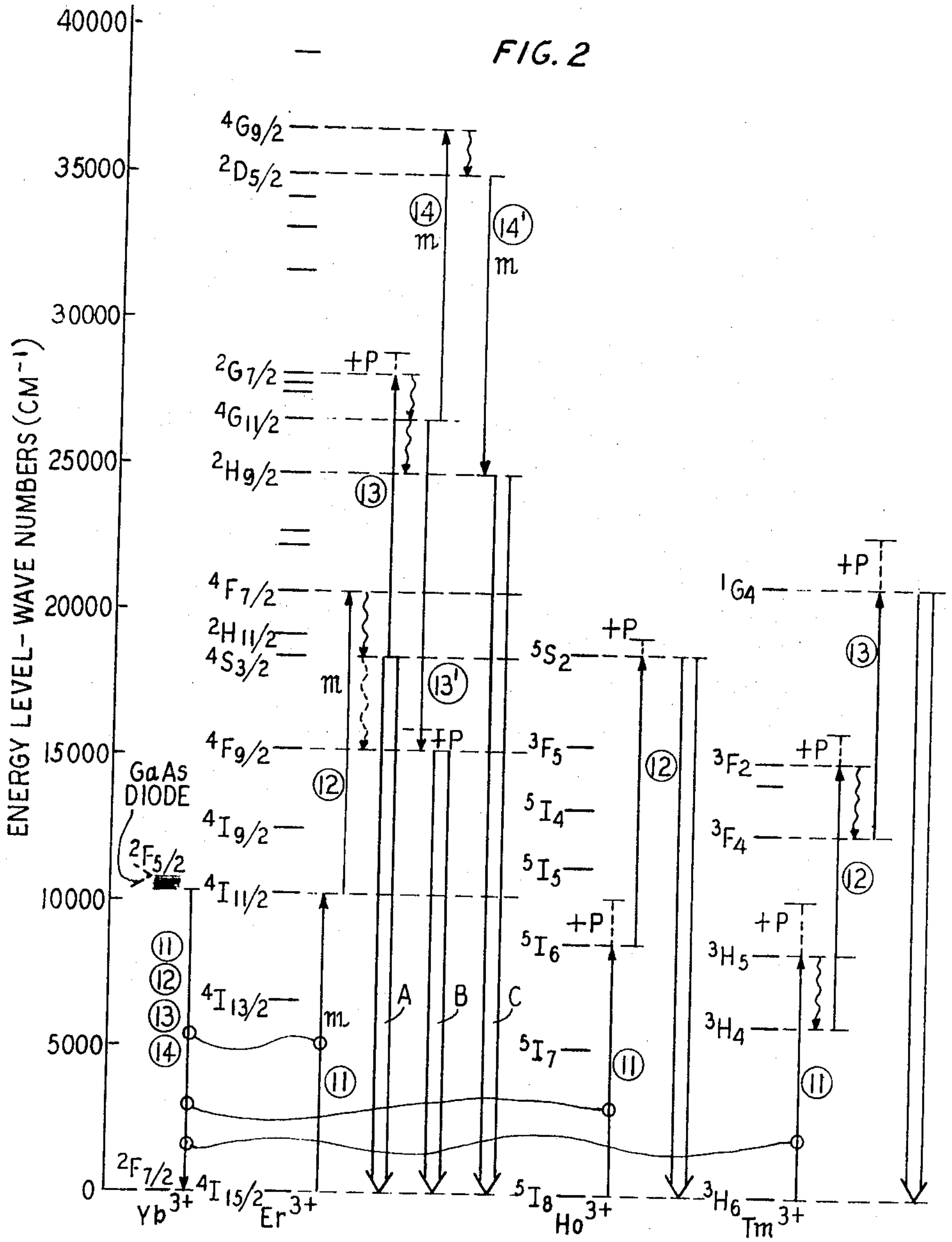
FIG. 2 is an energy level diagram in ordinate units of wave numbers for the ions $Yb^{3+}$, $Er^{3+}$, $Ho^{3+}$ and $Tm^{3+}$ within the crystallographic environment provided by a composition herein.
Figure 1:
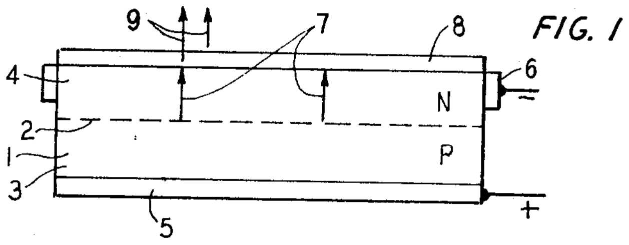
FIG. 1 is a front elevational view of an infrared emitting diode having a phosphor converting coating in accordance with the invention.

Gallium arsenide diode 1 containing PN junction 2, defined by P and N regions 3 and 4, respectively, is forward-biased by planar anode 5 and ring cathode 6 connected to power supply not shown. Infrared radiation is produced by junction 2 under forward-biased conditions, and some of this radiation, represented by arrows 7, passes into and through layer 8 of a phosphorescent material in accordance with the invention. Under these conditions, some part of radiation 7 is absorbed within layer 8, and a major portion of that absorbed participates in a two-photon or higher order process to produce radiation at a visible wavelength/s. The portion of this reradiation which escapes is represented by arrows 9.

The main advantage of the defined phosphors is best described in terms of the energy level diagram of FIG. 2. While this energy level diagram is a valuable aid in the description of the invention, two reservations must be made. The specific level values, while reasonably illustrative of those for the various included compositions of the noted type, are most closely representative of the oxychloride systems either of the YOCl or $Y_3OCl$ 7 stoichiometries. Also, while the detailed energy level description was determined on the basis of carefully conducted absorption and emission studies, some of the information contained in the figure represents only one tentative conclusion. In particular, the excitation routes for the 3 and 4 photon processes are not certain although it is clear that certain of the observed emission represents a multiple photon process in excess of doubling. The diagram is sufficient for its purpose; that is, it does describe the common advantages of the included host materials and, more generally, of the included phosphors in the terminology which is in use by quantum physicists.

For example, phosphor coating 8 may contain an additional inert ingredient or ingredients serving, for example, to improve adhesion to the substrate 4 and/or to reduce light scattering between particles where coating 8 is particulate. Still another purpose which may be served by an inert ingredient is to "encapsulate" the coating material so as to protect it from any harmful environment.

FIG. 2 contains information on $Yb^{3+}$, $Er^{3+}$, $Ho^{3+}$ and $Tm^{3+}$. While the pairs $Yb^{3+}$—$Ho^{3+}$ and $Yb^{3+}$—$Tm^{3+}$ are not the most efficient for energy up conversion, the former does provide a strong green fluorescence and enables a desirable color shift and improvement in efficiency when included as an ancillary pair with $Yb^{3+}$—$Er^{3+}$. Further, the $Yb^{3+}$—$Tm^{3+}$ couple provides a source of blue fluorescence.

The ordinate units are in wavelengths per centimeter ($cm^{-1}$). These units may be converted to wavelength in angstrom units (A.) or microns ($\mu$) in accordance with the relationship:

$$\text{Wavelength}=\frac{10^8}{\text{Wave numbers}}\text{A}=\frac{10^4}{\text{Wave numbers}}\mu.$$

The left-hand portion of the diagram is concerned with the relevant manifolds of $Yb^{3+}$ in a host of the invention. Absorption in $Yb^{3+}$ results in an energy increase from the ground manifold $Yb^2F_{7/2}$ to the $Yb^2F_{5/2}$ manifold. This absorption defines a band which includes levels at 10,200cm$^{-1}$, 10,500 cm$^{-1}$ and 10,700 cm$^{-1}$. The positions of these levels are affected by the crystal field splitting within the structures having at least one each of two different anions or at least one anion vacancy per unit cell or formula unit. In the oxychlorides, for example, they include a broad absorption which peaks at about 0.94$\mu$ (10,600 cm$^{-1}$), there is an efficient transfer of energy from a silicon-doped GaAs diode (with its emission peak at about 0.93$\mu$). This contrast with the comparatively small splitting in lanthanum fluoride and other less anisotropic hosts in which absorption peaking is at about 0.98$\mu$ for $Yb^{3+}$.

The remainder of FIG. 2 is discussed in conjunction with the postulated excitation mechanism. All energy level values and all relaxations indicated on the figure have been experimentally verified.

2. POSTULATED EXCITATION MECHANISMS

Following absorption by $Yb^{3+}$, of emission from the GaAs diode, a quantum is yielded to the emitting ion $Er^{3+}$ (or as also discussed in conjunction with the figure, to $Ho^{3+}$ or $Tm^{3+}$). The first transition is denoted 11. Excitation of $Er^{3+}$ to the $^4I_{11/2}$ is almost exactly matched in energy (denoted by m) to the relaxation transition of $Yb^{3+}$. However, a similar transfer, resulting in excitation of $Ho^{3+}$ to $Ho^5I_6$ or $Tm^{3+}$ to $Tm^3H_5$, requires a simultaneous release of one or more phonons (+P). The manifold $Er^4I_{11/2}$ has a substantial lifetime, and transfer of a second quantum from $Yb^{3+}$ promotes transition 12 to the $Er^4F_{7/2}$ manifold. Transfer of a second quantum to $Ho^{3+}$ or $Tm^{3+}$ results in excitation to $Ho^5S_2$ or, after internal relaxation from $Tm^3H_5$ to $Tm^3H_4$ (by yielding energy as phonons in the matrix), excitation to $Tm^3F_2$ with simultaneous generation of a phonon. Internal relaxation is represented on this figure by the wavy arrow ( ≀ ). In erbium, the second photon level ($Er^5F_{7/2}$) has a lifetime which is very short due to the presence of close, lower lying levels which results in rapid degradation to the $Er^4S_{3/2}$ state through the generation of phonons.

The first significant emission of $Er^{3+}$ is from the $Er^4S_{3/2}$ state (18,200cm$^-$ or 0.55$\mu$ in the green). This emission is denoted in the figure by the broad (double line) arrow A. The reverse of the second photon excitation, the nonradiative transfer of a quantum from $Er^4F_{7/2}$ back to $Yb^{3+}$ must compete with the rapid phonon relaxation to $Er^4S_{3/2}$ and is not limiting. The phonon relaxation to $Er^2F_{9/2}$ also competes with emission A and contributes to emission from that level. The extent to which this further relaxation is significant is composition dependent. The overall considerations as to the relationship between the predominant emissions and composition are discussed under the heading "Composition".

Green emission A at a wavelength of about 0.55$\mu$ corresponds to that which has been observed for Er in $LaF_3$. In accordance with this invention, it has been shown that the structures having mixed anions or anion vacancies with large resulting anisotropic environments about the cations are characterized by large crystal field splittings which significantly improve the absorption of GaAs:Si emission by $Yb^{3+}$. Large crystal field splittings also result in increased opportunity for internal relaxation mechanisms involving phonon generation which thus far have not been found to be pronounced in comparable but more isotropic media. For $Er^{3+}$, this enhances emission B at red wavelengths. Erbium emission B is, in part, brought about by transfer of a third quantum from $Yb^{3+}$ to $Er^{3+}$ which excites the ion from $Er^4S_{3/2}$ to $Er^2G_{7/2}$ with simultaneous generation of a phonon (transition 13). This is followed by internal relaxation to $Er^4G_{11/2}$ which, in turn, permits relaxation to $Er^2F_{9/2}$ by transfer of a quantum back to $Yb^{3+}$ with the simultaneous generation of a phonon (transition 13'). The $Er^2F_{9/2}$ level is thereby populated by at least two distinct mechanisms and indeed experimental confirmation arises from the finding that emission B is dependent on a power of the input intensity which is intermediate in character to that characteristic of a three-phonon process and that characteristic of a two-phonon process for the $Y_3OCl_7$ host. Emission B, in the red, is at about 15,250cm$^{-1}$ or 0.66$\mu$.

While emissions in the green and red are predominant, there are many other emission wavelengths of which the next strongest designated C is in the blue (24,400cm$^{-1}$ or 0.41$\mu$). This third emission designated C originates from the $Er^2H_{9/2}$ level which is, in turn, populated by two mechanisms. In the first of these, energy is received by a phonon process from $Er^4G_{11/2}$ The other mechanism is a four-photon process in accordance with which a fourth quanta is transferred from $Yb^{3+}$ to $Er^{3+}$ exciting $Er^4G_{9/2}$ from $Er^4G_{11/2}$ (transition 14). This step is followed by internal relaxation to $Er^2D_{5/2}$ from which level energy can be transferred back to Yb relaxing Er to $Er^2H_{9/2}$ (transition 14').

Significant emission from holmium occurs only by a two-photon process. Emission is predominantly from $Ho^5S_2$ in the green (18,350cm$^{-1}$ or 0.54$\mu$). A similar process in thulium also results in emission by a three-photon process (from $Tm'G_4$ in the blue at about 21,000cm$^{-1}$ or 0.47$\mu$). The responsible mechanisms are clear from FIG. 2 and the foregoing discussion.

3. MATERIAL PREPARATION

Since the phosphors of the invention are in powder or polycrystalline form, growth presents no particular problem. Oxychlorides, for example, may be prepared by dissolving the oxides (rare earth and yttrium oxides) in hydrochloric acid, evaporating to form the hydrated chlorides, dehydrating, usually near 100° C. under vacuum, and treating with $Cl_2$ gas at an elevated temperature (about 900° C.). The resulting product can be the one or more oxychlorides, the trichloride or mixtures of these depending on the dehydrating conditions, vacuum integrity and cooling conditions. The trichloride melts at the elevated temperature and may act as a flux to crystallize the oxychlorides. The YOCl structure is favored by high Y contents, intermediate dehydration rates and slow cooling rates while more complex chlorides such as $(Y, Yb)_3OCl_7$ are favored by high rare earth content, slow dehydration and fast cooling. The trichloride may subsequently be removed by washing with water. Dehydration should be sufficiently slow (usually 5 minutes or more) to avoid excessive loss of chlorine.

Oxybromides and oxyiodides may be prepared by similar means using hydrobromic acid and gaseous HBr or hydroiodic acid and gaseous HI in place of hydrochloric acid and $Cl_2$ in the process.

Mixed halides such as those containing both alkali metals and rare earths can be prepared by dissolving the oxides in HCl, precipitating with HF, dehydrating and melting the resulting material together near 1,000° C. in vacuum or simply by fusing an intimate mixture of the alkali metal and rare earth halides in vacuum.

Lead or alkaline earth fluorochloride or the corresponding fluorobromide may be prepared simply by melting the appropriate halides together in vacuum. The products can, in turn, be melted together with the oxyhalide and/or fluorohalide phosphors to adjust their properties.

Appropriate rare earth oxides have anion defect structures which contribute to the nonisotropic nature of the crystal field. These materials can be prepared by heating their chlorides to form powders and by Flame Fusion to form crystals, if desired.

4. COMPOSITION

The essence of the invention is the use of a host matrix for the activator and sensitizer ions having at least one each of two different anions or at least one anion vacancy in at least one percent of the unit cells or formula units. Examples of overall host compositions are rare earth oxides and yttrium oxide where only six of eight available neighboring sites are occupied; rare earth and yttrium oxychlorides, oxybromides, oxyiodides; the corresponding bismuth compounds (those containing BiOCl, for example);

the oxychalkogenides (those containing ThOS, for example); alkali metal rare earth (or yttrium) fluorohalides of the forms $M^{1+}M^{3+}X_4$, $M^{1+}M_3^{3+}X_{10}$, or $M_3^{1+}M^{3+}X_6$ and alkaline earth or lead fluorohalides of the form $M^{2+}X_2$ where $M^{1+}$ = Li, Na, K, Rb, Cs or Ti; $M^{2+}$ = Ca, Sr, Ba or Pb; $M^{3+}$ = La, Gd, Lu, Y, Bi or Yb and X = F, Cl, Br or I. The 1 percent minimum requirement implies the possibility of mixed host compositions and such mixtures may include any number of the foregoing.

The oxychlorides, oxybromides and oxyiodides are preferred embodiments of the structures involved and, of these, the oxychlorides are the preferred class. The latter consist of at least two varieties although others are not to be construed as excluded. These have various structures including (a) the tetragonal D(7/4h)—P4/nmm structure in common with YOCl or (b) a hexagonal structure, with an oxygen to chlorine ratio of less than one, for which a composition with the analyzed metal ratios: *Y*=56%, *Yb*=43% and *Er*=1%, lattice constants $a_0$=5.607 and $c_0$=9.260 and prominent d-spacings of 9.20, 2.33, 3.09, 4.62 and 2.83 are typical. Analyses indicate a structure $(RE)_3OCl_7$, where RE = Rare Earths + Y, for the latter. Of these two structures, (b) is preferred due to a greater range of fluorescent characteristics and is generalized as $Y_3OCl_7$ for simplification herein.

While the structural considerations are paramount, the compositions must also contain the requisite ion pair $Yb^{3+}$—$Er^{3+}$, $Yb^{3+}$—$Ho^{3+}$, mixtures thereof, or $Yb^{3+}$—$Tm^{3+}$. As described in conjunction with FIG. 2, initial transfer of energy is to $Yb^{3+}$. A minimum of this ion is set at 5 percent based on total cation content, since appreciably below this level transfer is insufficient to produce an expedient output efficiency regardless of the erbium content. A preferred minimum of about 10 percent on the same basis may, under appropriate conditions, result in an output intensity competitive with the best gallium phosphide diode. The maximum ytterbium content is essentially 100 percent on the same basis, and it is an advantage of compositions of the invention that such rate earth levels may be tolerated. For ytterbium content above 80 percent however, brightness does not increase substantially with increasing ytterbium; and this level, therefore, represents a preferred maximum.

It has been noted that the strong fluorescence of Er may vary from essentially pure green emission at about 0.55$\mu$ to a mixture of green and red, the latter at about 0.66$\mu$. Due to the effect of exchange coupling of Yb to Er on internal relaxation, red emission from erbium becomes dominant for larger ytterbium concentration. Generally, ytterbium concentration between about 20 percent and 50 percent results in mixed green and red output while amounts in excess of about 50 percent, under most circumstances, result in output approaching pure red. A preferred range for a red emitting phosphor coating, therefore, lies between 50 and 80 percent $Yb^{3+}$.

The erbium range is from about one-sixteenth to about 20 percent. Below the minimum, erbium output is not appreciable. Above the maximum, which is only approached for high Yb concentrations, internal radiationless processes substantially quench erbium output. A preferred range is from about one-fourth to about 2 percent. The minimum is dictated by the subjective criterion that only at this level does a coated diode with sufficient brightness for observation in a normally lighted room result. The upper limit results from the observation that further increase does not substantially increase output.

Holmium, recommended as an adjunct to erbium in conjunction with ytterbium, as well as with ytterbium alone, may be included in an amount from about one-fiftieth to about 5 percent to obtain green emission or to aid the green output of erbium. Such activation may be desirable in the intermediate 20 to 50 percent Yb range alone or when erbium is present as well as at greater concentrations of the Yb. Lesser amounts of holmium produce little discernible output as viewed by the eye. Amounts substantially larger than 2 percent result in no substantial increase and above about 10 percent result in substantial quenching. Thulium may also activate the oxychlorides, and its value is premised on its blue output. Amounts of from about one-sixteenth to about 5 percent are effective. Limits are derived from the same considerations discussed with holmium.

Where the required cation content of the host is not met by the total Yb+Er+Ho+Tm, "inert" cations may be included to make up the deficiency. Such cations desirably have no absorption levels below and within a small number of phonons of any of the levels relevant to the described multiphoton process. A cation which has been found suitable is yttrium. Others are $Pb^{2+}$, $Gd^{3+}$, $Na^{1+}$ as well as other such ions listed above.

Other requirements are common to phosphor materials in general. Various impurities which may produce unwanted absorption or which may otherwise "poison" the inventive systems are to be avoided. As a general premise, maintaining the compositions at a purity level resulting from use of starting ingredients which are three nines pure (99.9 percent) is adequate. Further improvement, however, results from further increase in purity at least to the five nines level.

Generally, preferred compositions herein contain two or more different anions in at least 1 percent of the unit cells or equivalent. The anisotropic crystal field conditions resulting from different anion site occupancies in the same unit cell tend to increase overall quantum efficiency. However, it is noted that as little as 1 percent of such cells provides significant improvement of properties. With reference to such unit cells, preferred compositions herein invariably contain either oxygen or fluorine at admixture with a different anion (this grouping is intended to include oxychlorides). While the advantages gained by the use of the inventive materials are largely premised on increased brightness for equivalent conditions such as doping levels, it has also been noted that visible emission may be at a variety of or combination of wavelengths. On the basis of a large number of experimental runs, some of which are represented below, it has been observed that red $Er^{3+}$ emission is enhanced by the presence of oxygen. In fact, as noted, for the simple oxychloride with a 1:1 anion ratio, only red emission is apparent to the eye under most conditions.

It has also been observed that the presence of chlorine results in a significant improvement in overall brightness, again, for equivalent doping and pump levels. This effect is essentially independent of the prevalent color of the visible output. Accordingly, a simple oxychloride is brighter in the red than is a simple oxybromide which is also red. A fluorochloride which emits largely in the green is brighter than is the equivalent fluorobromide.

The two paragraphs above are concerned only with the unit cells containing mixed anions. While the minimal requirement for compositions herein is about 1 percent of the total number of unit cells in the composition being of such nature, further enhancement results as the number of cells is increased. Under usual conditions, maximum overall efficiency is, in fact, obtained when all of the unit cells contain such mixed anions, although it is possible that circumstances may exist in which activator doping levels are such as to result in concentration quenching.

5. EXAMPLES

The following specific examples were selected from a larger number to represent the more significant compositional variations. While the preparatory procedure is described in detail in the first two examples, such description in each succeeding example is considered unnecessarily repetitious. It is believed that the general preparatory technique described above is sufficient to enable a worker in the field to reproduce any composition within the inventive range.

EXAMPLE 1

A composition represented nominally as $(Y_{0.7}Yb_{0.29}Er_{0.01})_3OCl_7$ was prepared from the following starting ingredients.

| | |
|---|---|
| $Y_2O_3$ | 1.58 grams |
| $Yb_2O_3$ | 1.14 grams |
| $Er_2O_3$ | 0.038 grams |

All materials were particulate to facilitate dissolution. The oxidic materials were next dissolved in hydrochloric acid and this solvent was next evaporated to leave the mixed rare earth hydrated chloride. The residue was dried in air to remove unbonded (excess) $H_2O$. The resulting material was next placed in a quartz tube which was connected to a vacuum station after which tube and contents were maintained at 100° C. under vacuum for a period of 4 hours to remove water of hydration. With tube and contents still connected to the vacuum station, temperature was raised to 1,000° C. to produce a molten mixture of rare earth trichloride and rare earth oxychloride. The contents were next cooled and the trichloride was removed by dissolving in water. Crystals of the approximate composition set forth were produced by spontaneous nucleation during cooling.

Crystals of the final composition were admixed with collodion and the composite was painted on the surface of a silicon doped gallium arsenide diode capable of emitting at an infrared wavelength at about 0.93$\mu$ when forward biased. The diode was biased at about 1 volt in the forward direction under which conditions current flow was observed to be about 1 ampere. The coated portion of the diode glowed an apparent yellow-red color (spectroscopically observed to represent a measure of green and red wavelengths). Quantum efficiency (visible output divided by infrared absorbed by the phosphor) was estimated to be at a level in excess of 20 percent. Note: Maximum quantum efficiency for the prevalent third-photon transition is 33⅓ percent since three quanta of infrared are by definition required to produce one quantum of visible output.

EXAMPLE 2

The approximate composition $Li(Y_{0.7}Yb_{0.29}Er_{0.01})(F,Cl)_4$ was produced from the following starting ingredients:

| | |
|---|---|
| $Y_2O_3$ | 1.58 grams |
| $Yb_2O_3$ | 1.14 grams |
| $Er_2O_3$ | 0.038 grams |
| LiCl | 0.85 grams |

The particulate starting materials were dissolved in hydrochloric acid. Hydrochloric acid was added resulting in the precipitation of white powder. The solvent was next removed by evaporating at 50° C. The powder was again placed in a quartz tube and contents were dried under vacuum at 100° C. for 4 hours to remove water of hydration. The temperature was again raised to 1,000° C. to melt the product. Tube and contents were permitted to cool so as to result in a particulate end product of the scheelite structure.

The powder was again mixed with collodion to minimize scatter loss and the mixture was painted on a gallium arsenide diode as in example 1. Under 1 volt forward bias (as in example 1), emission was green and of an efficiency comparable to example 1.

EXAMPLE 3

The composition represented by the approximate formula $Na(Y_{0.7}Yb_{0.29}Er_{0.01})F_{3.9}Cl_{0.1}$ was prepared by melting together at about 1300° C an intimate mixture of

| | |
|---|---|
| NaCl | 0.058 grams |
| NaF | 0.378 grams |
| $YF_3$ | 1.022 grams |
| $YbF_3$ | 0.666 grams |
| $ErF_3$ | 0.022 grams |

The final product had the $Na_2ThF_6$ structure. This product too was mixed with collodion and was painted on a GaAs diode which was biased as in example 1. Color and apparent brightness were as in example 2.

ADDITIONAL EXAMPLES

The following compositions were prepared in the general manner described above and were all exposed to infrared emission from a forward biased 0.93$\mu$ GaAs diode. Compositions are set forth in tabular form in terms of their approximate formulas, and apparent colors are indicated based on bias levels equivalent to those utilized in the above examples. The apparent colors were as set forth. While not indicated, many of the phosphors could be made to yield a range of apparent colors by changing the bias conditions on the diodes.

TABLE

| | |
|---|---|
| $Yb_{0.99}Er_{0.01}OCl$ | Red. |
| $(Yb_{0.99}Er_{0.01})_3OCl_7$ | Red. |
| $Yb_{0.995}Ho_{0.005}OCl$ | Green. |
| $(Yb_{0.995}Ho_{0.005})_3OCl_7$ | Do. |
| $Yb_{0.995}Tm_{0.005}OCl$ | Blue. |
| $(Yb_{0.995}Tm_{0.005})_3OCl_7$ | Do. |
| $(Yb_{0.5}Y_{0.49}Er_{0.01})OCl$ | Red. |
| $Yb_{0.5}Y_{0.49}Ho_{0.01}OCl$ | Green. |
| $Yb_{0.5}Y_{0.49}Tm_{0.01}OCl$ | Blue. |
| $(Yb_{0.5}Y_{0.49}Er_{0.01})_3OCl_7$ | Red. |
| $(Yb_{0.5}Y_{0.49}Ho_{0.01})_3OCl_7$ | Green. |
| $(Yb_{0.5}Y_{0.49}Tm_{0.01})_3OCl_7$ | Blue. |
| $Yb_{0.15}Y_{0.84}Er_{0.01}OCl$ | Red. |
| $(Yb_{0.15}Y_{0.84}Er_{0.01})_3OCl_7$ | Red. |
| $(Yb_{0.29}Y_{0.7}Er_{0.01})_3OCl_7$ | Red. |
| $(Yb_{0.29}Y_{0.7}Er_{0.01}Ho_{0.005})_3OCl_7$ | Red. |
| $Li(Yb_{0.29}Y_{0.7}Er_{0.01})F_{3.9}Cl_{0.1}$ | Green. |
| $Na(Yb_{0.29}Y_{0.7}Er_{0.01})F_{3.9}Cl_{0.1}$ | Do. |
| $K(Yb_{0.29}Y_{0.7}Er_{0.01})F_{3.9}Cl_{0.1}$ | Do. |
| $Rb(Yb_{0.29}Y_{0.7}Er_{0.01})F_{3.9}Cl_{0.1}$ | Do. |
| $Cs(Yb_{0.29}Y_{0.7}Er_{0.01})F_{3.9}Cl_{0.1}$ | Do. |
| $Li(Yb_{0.29}Y_{0.7}Er_{0.01})F_2Cl_2$ | Do. |
| $Na(Yb_{0.29}Y_{0.7}Er_{0.01})F_2Cl_2$ | Do. |
| $K(Yb_{0.29}Y_{0.7}Er_{0.01})F_2Cl_2$ | Do. |
| $Rb(Yb_{0.29}Y_{0.7}Er_{0.01})F_2Cl_2$ | Do. |
| $Cs(Yb_{0.29}Y_{0.7}Er_{0.01})F_2Cl_2$ | Do. |
| $Li(Yb_{0.29}Y_{0.7}Er_{0.01})F_{3.9}Cl_{0.1}\cdot(Yb_{0.29}Y_{0.7}Er_{0.01})OCl$ | Red. |
| $Na(Yb_{0.29}Y_{0.7}Er_{0.01})F_{3.9}Cl_{0.1}\cdot(Yb_{0.29}Y_{0.7}Er_{0.01})OCl$ | Red. |
| $K(Yb_{0.29}Y_{0.7}Er_{0.01})F_{3.9}Cl_{0.1}\cdot(Yb_{0.29}Y_{0.7}Er_{0.01})OCl$ | Red. |
| $Rb(Yb_{0.29}Y_{0.7}Er_{0.01})F_{3.9}Cl_{0.1}\cdot(Yb_{0.29}Y_{0.7}Er_{0.01})OCl$ | Red. |
| $Cs(Yb_{0.29}Y_{0.7}Er_{0.01})F_{3.9}Cl_{0.1}\cdot(Yb_{0.29}Y_{0.7}Er_{0.01})OCl$ | Red. |
| $Li(Yb_{0.29}Y_{0.7}Er_{0.01})F_2Cl_2\cdot(Yb_{0.29}Y_{0.7}Er_{0.01})OCl$ | Red. |
| $Na(Yb_{0.29}Y_{0.7}Er_{0.01})F_2Cl_2\cdot(Yb_{0.29}Y_{0.7}Er_{0.01})OCl$ | Red. |
| $K(Yb_{0.29}Y_{0.7}Er_{0.01})F_2Cl_2\cdot(Yb_{0.29}Y_{0.7}Er_{0.01})OCl$ | Red. |
| $Rb(Yb_{0.29}Y_{0.7}Er_{0.01})F_2Cl_2\cdot(Yb_{0.29}Y_{0.7}Er_{0.01})OCl$ | Red. |
| $Cs(Yb_{0.29}Y_{0.7}Er_{0.01})F_2Cl_2\cdot(Yb_{0.29}Y_{0.7}Er_{0.01})OCl$ | Red. |
| $PbFCl\cdot(Yb_{0.29}Y_{0.7}Er_{0.01})OCl$ | Red. |

TABLE – Continued

| | |
|---|---|
| $CaFCl\cdot(Yb_{0.29}Y_{0.7}Er_{0.01})OCl$ | Red. |
| $SrFCl\cdot(Yb_{0.29}Y_{0.7}Er_{0.01})OCl$ | Red. |
| $BaFCl\cdot(Yb_{0.29}Y_{0.7}Er_{0.01})OCl$ | Red. |
| $Na(Yb_{0.29}Y_{0.7}Er_{0.01})F_{9.9}Cl_{0.1}$ | Green. |
| $K_3(Yb_{0.29}Y_{0.7}Er_{0.01})F_{5.9}Cl_{0.01}$ | Do. |
| $Rb_3(Yb_{0.29}Y_{0.7}Er_{0.01})F_{5.9}Cl_{0.01}$ | Do. |
| $Cs_3(Yb_{0.29}Y_{0.7}Er_{0.01})F_{5.9}Cl_{0.01}$ | Do. |
| $PbFCl\cdot Li(Yb_{0.29}Y_{0.7}Er_{0.01})F_2Cl_2\cdot(Yb_{0.29}Y_{0.7}Er_{0.01})OCl$ | Red. |
| $PbFCl\cdot Na(Yb_{0.29}Y_{0.7}Er_{0.01})F_2Cl_2\cdot(Yb_{0.29}Y_{0.7}Er_{0.01})OCl$ | Red. |
| $PbFCl\cdot K(Yb_{0.29}Y_{0.7}Er_{0.01})F_2Cl_2\cdot(Yb_{0.29}Y_{0.7}Er_{0.01})OCl$ | Red. |
| $PbFCl\cdot Rb(Yb_{0.29}Y_{0.7}Er_{0.01})F_2Cl_2\cdot(Yb_{0.29}Y_{0.7}Er_{0.01})OCl$ | Red. |
| $PbFCl\cdot Cs(Yb_{0.29}Y_{0.7}Er_{0.01})F_2Cl_2\cdot(Yb_{0.29}Y_{0.7}Er_{0.01})OCl$ | Red. |
| $BaFCl\cdot Li(Yb_{0.29}Y_{0.7}Er_{0.01})F_2Cl_2\cdot(Yb_{0.29}Y_{0.7}Er_{0.01})OCl$ | Red. |
| $BaFCl\cdot Na(Yb_{0.29}Y_{0.7}Er_{0.01})F_2Cl_2\cdot(Yb_{0.29}Y_{0.7}Er_{0.01})OCl$ | Red. |
| $BaFCl\cdot K(Yb_{0.29}Y_{0.7}Er_{0.01})F_2Cl_2\cdot(Yb_{0.29}Y_{0.7}Er_{0.01})OCl$ | Red. |
| $BaFCl\cdot Rb(Yb_{0.29}Y_{0.7}Er_{0.01})F_2Cl_2\cdot(Yb_{0.29}Y_{0.7}Er_{0.01})OCl$ | Red. |
| $BaFCl\cdot Cs(Yb_{0.29}Y_{0.7}Er_{0.01})F_2Cl_2\cdot(Yb_{0.29}Y_{0.7}Er_{0.01})OCl$ | Red. |
| $PbFCl\cdot Li(Yb_{0.29}Y_{0.7}Er_{0.01})F_{3.9}Cl_{0.1}\cdot(Yb_{0.29}Y_{0.7}Er_{0.01})OCl$ | Red. |
| $PbFCl\cdot Na(Yb_{0.29}Y_{0.7}Er_{0.01})F_{3.9}Cl_{0.1}\cdot(Yb_{0.29}Y_{0.7}Er_{0.01})OCl$ | Red. |
| $PbFCl\cdot K(Yb_{0.29}Y_{0.7}Er_{0.01})F_{3.9}Cl_{0.1}\cdot(Yb_{0.29}Y_{0.7}Er_{0.01})OCl$ | Red. |
| $PbFCl\cdot Rb(Yb_{0.29}Y_{0.7}Er_{0.01})F_{3.9}Cl_{0.1}\cdot(Yb_{0.29}Y_{0.7}Er_{0.01})OCl$ | Red. |
| $PbFCl\cdot Cs(Yb_{0.29}Y_{0.7}Er_{0.01})F_{3.9}Cl_{0.1}\cdot(Yb_{0.29}Y_{0.7}Er_{0.01})OCl$ | Red. |
| $BaFCl\cdot Li(Yb_{0.29}Y_{0.7}Er_{0.01})F_{3.9}Cl_{0.1}\cdot(Yb_{0.29}Y_{0.7}Er_{0.01})OCl$ | Red. |
| $BaFCl\cdot Na(Yb_{0.29}Y_{0.7}Er_{0.01})F_{3.9}Cl_{0.1}\cdot(Yb_{0.29}Y_{0.7}Er_{0.01})OCl$ | Red. |
| $BaFCl\cdot K(Yb_{0.29}Y_{0.7}Er_{0.01})F_{3.9}Cl_{0.1}\cdot(Yb_{0.29}Y_{0.7}Er_{0.01})OCl$ | Red. |
| $BaFCl\cdot Rb(Yb_{0.29}Y_{0.7}Er_{0.01})F_{3.9}Cl_{0.1}\cdot(Yb_{0.29}Y_{0.7}Er_{0.01})OCl$ | Red. |
| $BaFCl\cdot Cs(Yb_{0.29}Y_{0.7}Er_{0.01})F_{3.9}Cl_{0.1}\cdot(Yb_{0.29}Y_{0.7}Er_{0.01})OCl$ | Red. |

The invention has been described in terms of essential ingredients. Accordingly, in the usual form of the invention, the exact form of the phosphor is not specified. Where this phosphor is included as an adherent coating on a diode, it may be desirable to include some inert material (inert from the phosphorescent standpoint). Such material may serve to improve adhesion between the phosphor and the diode and/or may serve the function of reducing light scattering between particles in a coating or between the diode and the particles.

For the latter use, it is, of course, desired that the "inert" material have a refractive index which is approaching or exceeding that of the phosphor. In some cases, an inert material with an index approximating that of the GaAs is preferred. Typical index values for this purpose are approximately 2 to 3.5 on the usual scale in which vacuum is graded as unity. The use of such additional material or materials is of particular significance in the preferred embodiments in which the phosphor material is made up of the crystalline matter. Where the phosphor is itself amorphous, the inert material may be of little advantage. In any event, where such additional material is incorporated in a phosphor coating, the amount is desirably kept to a minimum sufficient for the intended purpose, be it to enhance adhesion and/or to reduce scattering. Since this additional material is inert from the phosphorescent standpoint, it otherwise acts only as a diluent and so reduces the overall quantum efficiency of the overall device.

What is claimed is:

1. Electro-luminescent device for producing radiation in the visible spectrum including a gallium arsenide PN junction diode capable of producing infrared radiation when biased, said diode being provided with a phosphor for converting said infrared radiation to radiation in the visible spectrum, said phosphor comprising the trivalent ion of ytterbium characterized in that the said phosphor consists essentially of a composition in which the population of at least two anion sites differ in at least one percent of the said phosphor in that at least 5 cation percent of the phosphor is $Yb^{3+}$, in that the phosphor contains at least one cation in the minimum cation percent selected from the group which consists of one-sixteenth percent $Er^{3+}$, one-sixteenth percent $Tm^{3+}$ and one-fiftieth percent $Ho^{3+}$, and in that the said phosphor contains at least one oxychloride compound.

2. Device of claim 1 in which the said phosphor contains an ion combination selected from the group consisting of $Yb^{3+}$—$Er^{3+}$, $Yb^{3+}$—$Ho^{3+}$, $Yb^{3+}$—$Tm^{3+}$ and $Yb^{3+}$—$Er^{3+}$—$Ho^{3+}$.

3. Device of claim 2 in which the said ion combination is $Yb^{3+}$—$^{3+}$.

4. Device of claim 1 in which *a* is from 0.1 to 0.8.

5. Device of claim 1 in which *a* is from 0.10 to 0.999175, *b* is from 0.000625 to 0.1, *c* is from 0.0002 to 0.02 and *d* is 0.

* * * * *

UNITED STATES PATENT OFFICE
CERTIFICATE OF CORRECTION

Patent No. 3,659,136 Dated April 25, 1972

Inventor(s) W.H.Grodkiewicz, S.Singh, L.G.Van Uitert

It is certified that error appears in the above-identified patent and that said Letters Patent are hereby corrected as shown below:

In the Abstract, the last line should read:

$Yb^{3+}$-$Tm^{3+}$ or mixtures thereof.

Col. 1, line 51, change "$Yb^{3+}$-$^{3+}$" to --$Yb^{3+}$-$Er^{3+}$--;

line 55, change "of" second occurrence to --or--.

Col. 2, line 30, after "order" insert --photon--;

line 40, change "$Y_3OCl$ 7" to --$Y_3OCl_7$--;

Col. 3, line 45, change "(18,200cm$^{-}$" to --(18,200cm$^{-1}$ --.

Col. 5, line 43, change "rate earth" to --rare earth--.

Col. 10, line 37, Insert before the period

--, said compound being $Yb_aEr_bHo_cTm_dM_{1-a-b-c-d}OCl$ in which a is from 0.05 to 0.999375, b is from 0 to 0.20, c is from 0 to 0.05 and d is from 0 to 0.05 and in which M is at least one element selected from the group consisting of yttrium, lutecium, gadolinium and lanthanum.--.

Signed and Sealed this

Nineteenth Day of October 1976

[SEAL]

*Attest:*

RUTH C. MASON
*Attesting Officer*

C. MARSHALL DANN
*Commissioner of Patents and Trademarks*